(12) United States Patent
Nakamura et al.

(10) Patent No.: US 6,717,751 B2
(45) Date of Patent: Apr. 6, 2004

(54) IMAGE READING APPARATUS

(75) Inventors: Tetsuroh Nakamura, Takaraduka (JP); Masaichiro Tatekawa, Minoo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/106,328

(22) Filed: Mar. 27, 2002

(65) Prior Publication Data

US 2002/0141066 A1 Oct. 3, 2002

(30) Foreign Application Priority Data

Mar. 29, 2001 (JP) .................................. 2001-095813
Mar. 30, 2001 (JP) .................................. 2001-098263

(51) Int. Cl.[7] .......................... G02B 27/02; G02B 7/02
(52) U.S. Cl. ........................................ 359/806; 359/822
(58) Field of Search .............................. 359/804, 806, 359/811, 819, 822

(56) References Cited

U.S. PATENT DOCUMENTS 4,704,638 A * 11/1987 Igarashi ..................... 358/296
4,816,922 A * 3/1989 Futaki ....................... 358/484
5,835,242 A * 11/1998 Itoh .......................... 358/515
5,969,343 A * 10/1999 Nakamura et al. ...... 250/227.31
6,075,240 A * 6/2000 Watanabe et al. ........... 250/234

FOREIGN PATENT DOCUMENTS

WO   WO 02/07427   1/2002

\* cited by examiner

*Primary Examiner*—Ricky Mack
(74) *Attorney, Agent, or Firm*—McDermott, Will & Emery

(57) ABSTRACT

A size-reduced image reading apparatus for optically reading an image drawn on the document surface. The size reduction is achieved this way. Two light sources are so mounted over the document surface at a specific angle formed with the document surface that they are a certain distance away from each other and bilaterally symmetrical. These light sources are surface light emitters made by forming a light-emitting layer on a transparent substrate. And a fiber lens formed of a plurality of bundles of optical fibers is mounted in the gap between the two surface light emitters. Even if the surface light emitter is brought close to the reading position, a uniform illuminance intensity can be obtained at this reading position. Furthermore, if a fiber lens with a small diameter is used in place of the rod lens, the conjugate length can be shortened.

16 Claims, 19 Drawing Sheets

FIG.7

| | CONJUGATE LENGTH | LENGTH OF LENS | DISTANCE FROM THE LOWER END OF LENS TO DOCUMENT SURFACE |
|---|---|---|---|
| ANGULAR APERTURE: 120° | 3.2 ~ 10.0 | 1.4 ~ 4.4 | 0.9 ~ 2.8 |
| ANGULAR APERTURE: 40° | 8.0 ~ 25.0 | 3.6 ~ 11.4 | 2.2 ~ 6.6 |

(IN MM)

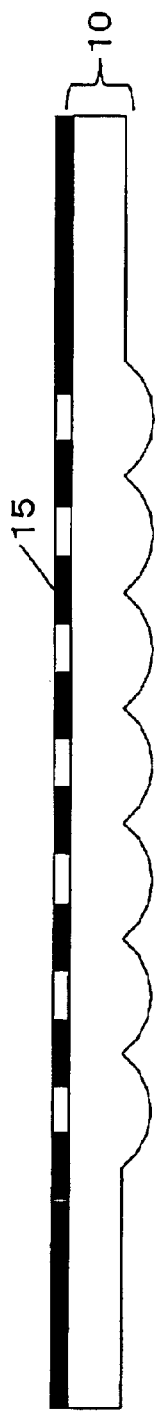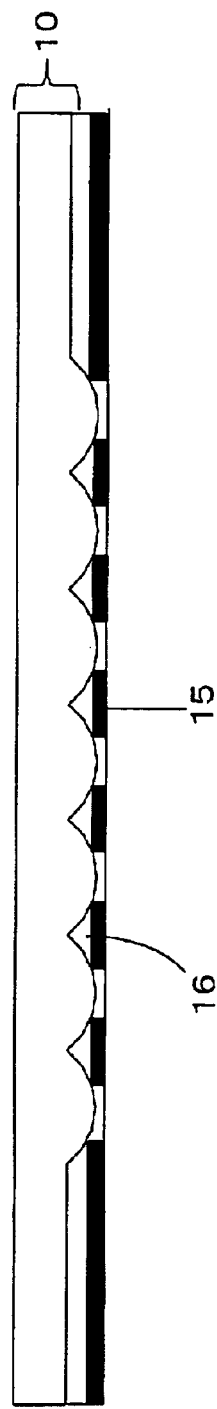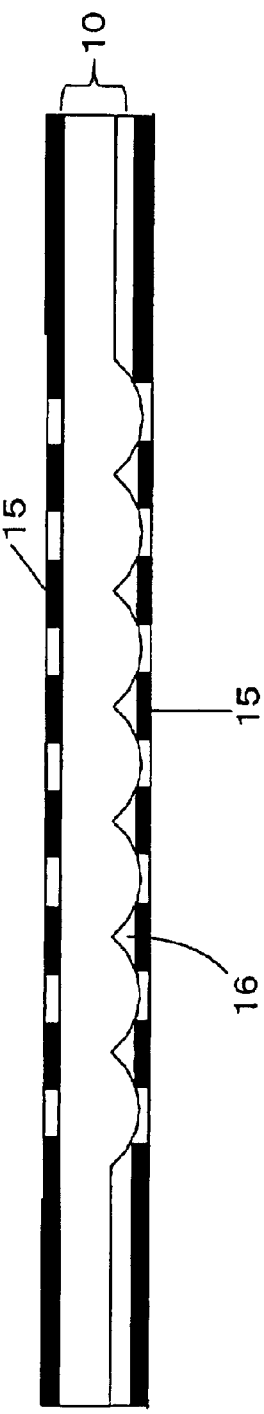

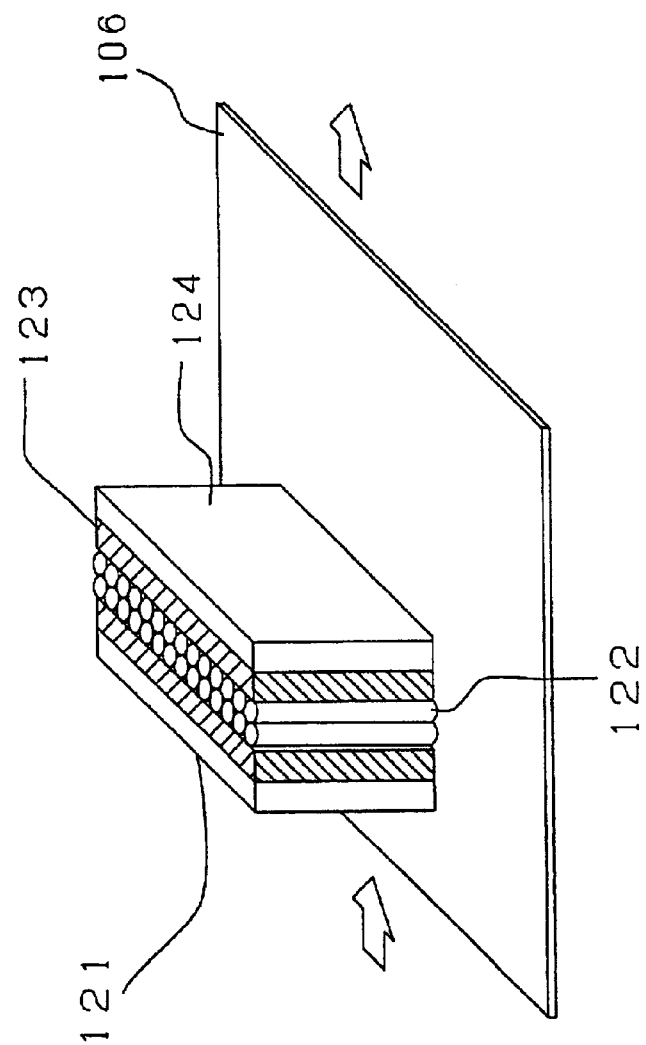

IMAGE READING APPARATUS

BACKGROUND OF THE INVENTION

1. Field of the Invention

The present invention relates to an apparatus for optically reading an image drawn on the document surface.

2. Prior Art of the Invention

A multi-function printer having the functions of copying machine, scanner, printer, facsimile machine etc. is provided with an image reading apparatus for optically reading an image drawn on the document surface.

The reduction optical system (reduction CCD system) has been well known as the image reading system. This apparatus has an advantage that even if the document is not in contact with the document table, a sharp image can be obtained by setting the focal depth deep. But its disadvantage is that the size is large. For this reason, the contact system in which information from the document is led to a sensor in the same magnification with an erect image as shown in FIG. 17 comes to be used when the size reduction or thickness reduction of the apparatus is needed.

In other words, LED arrays 112 are mounted over document surface 106 in such a way that they are bilaterally symmetrical. And the light sent to document surface 106 is reflected on the surface and received by rod lens array 121 mounted in an upper and middle position over two LED arrays 112.

The LED array 112 has many LED elements 125 mounted on substrate 124 as shown in FIG. 18. The rod lens array 121 has a specific number of cylindrical rod lenses 122 disposed side by side and sandwiched between substrates 124 as shown in FIG. 19.

In such a contact system, the distance between sensor 108 and document surface 106 (hereinafter "conjugate length") can be decreased and the whole size of the apparatus can be reduced considerably.

To further reduce the size of the apparatus, it is necessary to further shorten the conjugate length. To further shorten the conjugate length, the diameter of each rod lens 122 has to be reduced. However, the problem is that to reduce the diameter would cause much optical noise such as cross talk and flare light and an image projected on sensor 108 would be unclear.

To reduce the size of the apparatus, it is also important to place the light source near document surface 106 as far as possible. However, the prior art LED array is a set of point light sources and therefore unless this light source and document surface 106 are kept a certain distance away from each other, the illuminating strength can not be kept uniform. That is, the attempt to reduce the size of the apparatus using the prior art LED array is limited.

SUMMARY OF THE INVENTION

The present invention has been made in view of the above circumstances, and it is an object of the present invention to reduce the size of the image reading apparatus, and to achieve the object, the following means are adopted.

That is, two light sources are so mounted over the document surface that they are bilaterally symmetrical and kept a certain distance away from each other while forming a certain angle with the document surface. These light sources are surface light emitters made by forming a light emitting layer on a transparent substrate. In the gap between these two surface light emitters, there is provided a fiber lens formed by bundling a plurality of optical fibers.

With those surface light emitters, a uniform illuminating intensity can be obtained at the reading position even if those light sources are brought near the reading position. Furthermore, if a fiber lens smaller than the rod lens in diameter is used, the conjugate length can be shortened. Thus, it goes without saying that it permits the reduction of the size of the apparatus.

BRIEF DESCRIPTION OF THE DRAWINGS

FIG. 7 is an explanatory diagram of the conjugate length.

FIGS. 10A 10B and 10C are explanatory illustrations of micro lens arrays made by injection molding.

FIG. 19 is a perspective view of a rod lens array mounted in the prior art image reading apparatus.

DESCRIPTION OF THE PREFERRED EMBODIMENTS

Embodiment 1

First, the applicants of the present invention proposed use of a fiber lens in place of the rod lens 122 to the reduce the size of the image reading apparatus in unexamined Japanese patent application 2000-224156 etc.

Figure 4:
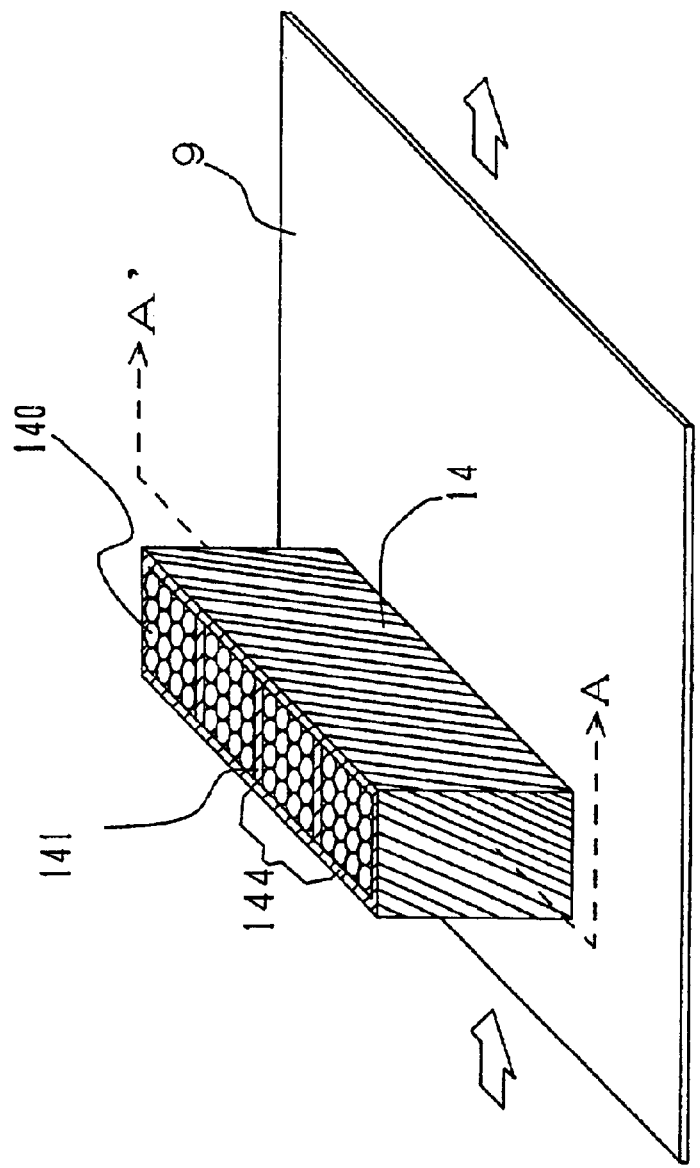
FIG. 4 is a perspective view of a fiber lens.

This fiber lens 14 is lens formed by bundling a plurality of optical fibers 140, each with a small diameter (not larger than 0.5 mm), as shown in FIG. 4. The refractive index of optical fiber 140 gradually decreases from the axis to the outer circumference, and therefore, light converges toward the center of optical fiber 140.

Figure 5:
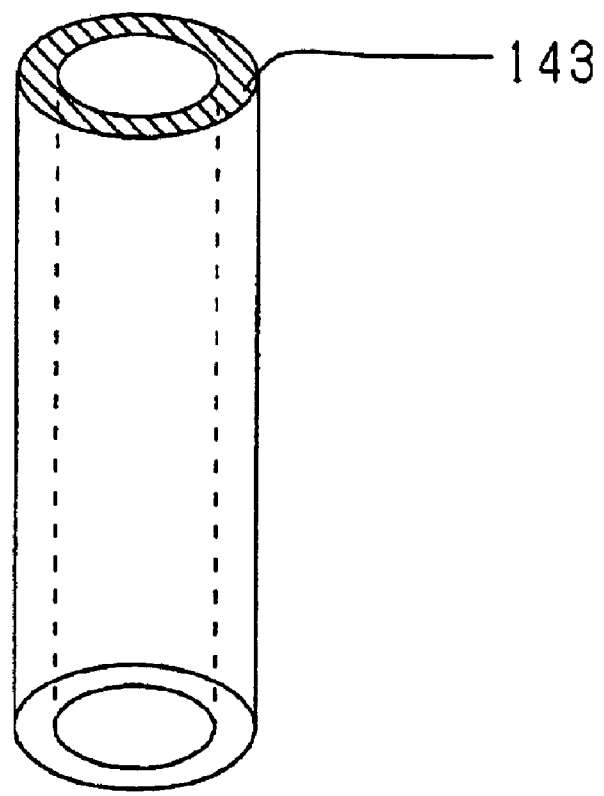
FIG. 5 is a perspective view of an optical fiber.

However, if the diameter of the lens is decreased like that, such phenomena as cross talk and flare will increase. To avoid that, it is necessary to form fiber bundle 144 by bundling a plurality of optical fibers 140 and form light absorbing layer 141 around each fiber bundle 144 as shown in FIG. 4, or to form light absorbing layer 143 around each optical fiber 140 as shown in FIG. 5.

Figure 6:
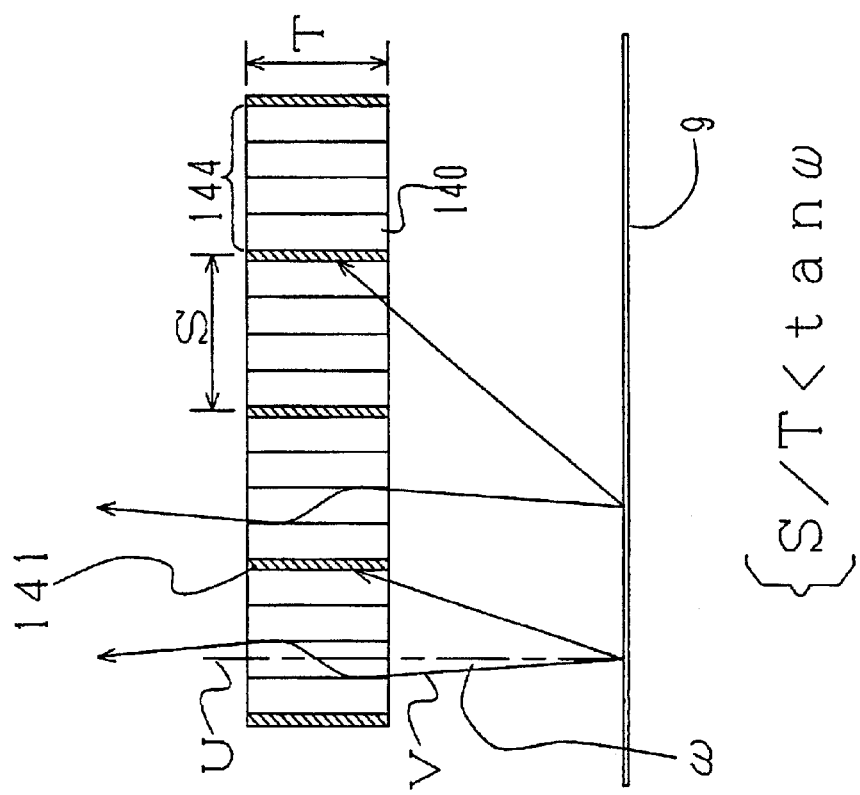
FIG. 6 is a sectional taken on line A–A' in FIG. 4.

To prevent such phenomena as cross talk and flare, it is desirable that the following relation is satisfied. That is, it is desirable that as shown in FIG. 6, length S of one side of fiber bundle 144 is so set that a value obtained by dividing length S by length T of optical fiber 140 is smaller than the tangent value of angular aperture ω.

This angular aperture ω is the maximum angle at which light can be transmitted normally. FIG. 6 shows that light V enters optical fiber 140 at the maximum angle at which light can be transmitted normally. In this FIG. 6, the angle formed between axis U of optical fiber 140 and incident light V is angular aperture ω.

In the prior art, rod lens 122 with a large diameter is used, and a conjugate length of 20 mm to 50 mm is required. For example, if rod lens 122 with a diameter of 0.6 mm, a length of 22.8 mm and an angular aperture of 4° is used, the conjugate length required is about 50 mm. If rod lens 122 with a diameter of 0.6 mm, a length of 8.8 mm and an angular aperture of 12° is used, the conjugate length required is about 20 mm.

Figure 1:
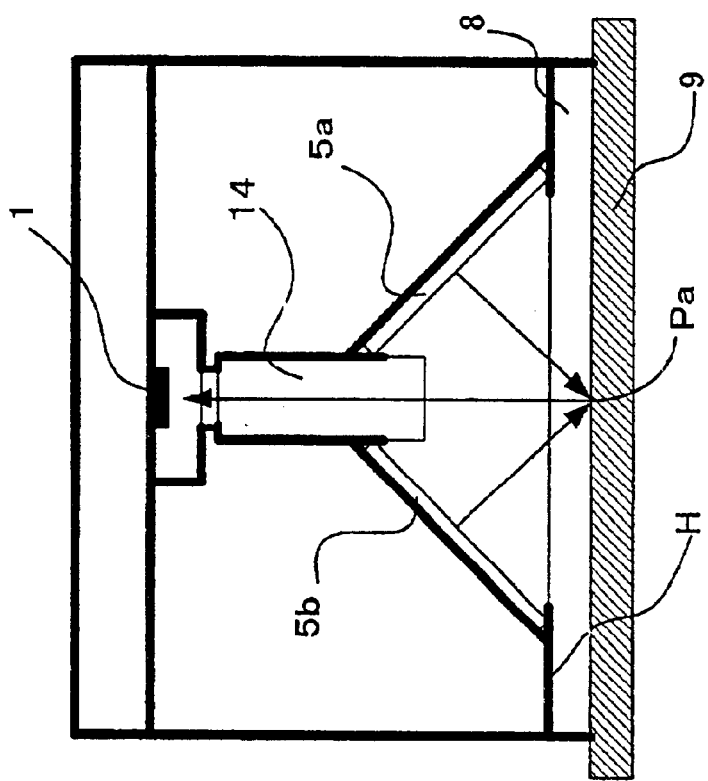
FIG. 1 is a constitutional diagram of an image reading apparatus to which the present invention is applied.

In the present invention, on the other hand, fiber lens 14 with a small diameter are used, and the distance (conjugate length) from sensor 1 to document surface 9 can be shortened as shown in FIG. 1. There will be explained about the conjugate length when the diameter, length and angular aperture are changed with reference to FIG. 7.

That is, when fiber lens 14 with a diameter of 0.3 mm, a length of 4.4 mm and an angular aperture of 12° was used, the conjugate length was 10.0 mm. In this case, the distance between the lower end of fiber lens 14 and document surface 9 was 2.8 mm.

When fiber lens 14 with a diameter of 0.3 mm, a length of 11.4 mm and an angular aperture of 4° was used, the conjugate length was 25.0 mm. In this case, the distance between the lower end of fiber lens 14 and document surface 9 was 6.6 mm.

Needless to say, if the diameter of fiber lens 14 is further reduced, the conjugate length can be still shorter as will be described in the following.

That is, when fiber lens 14 with a diameter of 0.1 mm, a length of 1.4 mm and an angular aperture of 12° was used, the conjugate length was 3.2 mm. In this case, the distance between the lower end of fiber lens 14 and document surface 9 was 0.9 mm.

When fiber lens 14 with a diameter of 0.1 mm, a length of 3.6 mm and an angular aperture of 4° was used, the conjugate length was 8.0 mm. In this case, the distance between the lower end of fiber lens 14 and document surface 9 was 2.2 mm.

As described above, fiber lens 14 with a small diameter is used, and the conjugate length can be shortened. Needless to say, that can reduce the size of the apparatus.

While examples where angular aperture of 12° and 4° have been shown, it goes without saying that the angular aperture is not limited to 12° and 4°.

To reduce the size of the apparatus, it is also important to place the light source near the document surface as far as possible. However, the prior art LED array is a set of point light sources, and therefore, unless this light source and the document surface are kept a certain distance away from each other, the uniformity of the illuminating intensity can not be secured. That is, there is a limit to an attempt to reduce the size of the apparatus using the prior art LED array.

As a solution, the applicants of the present invention proposed use of electroluminescence film as surface light emitter in unexamined Japanese patent application 2000-217561.

Figure 2:
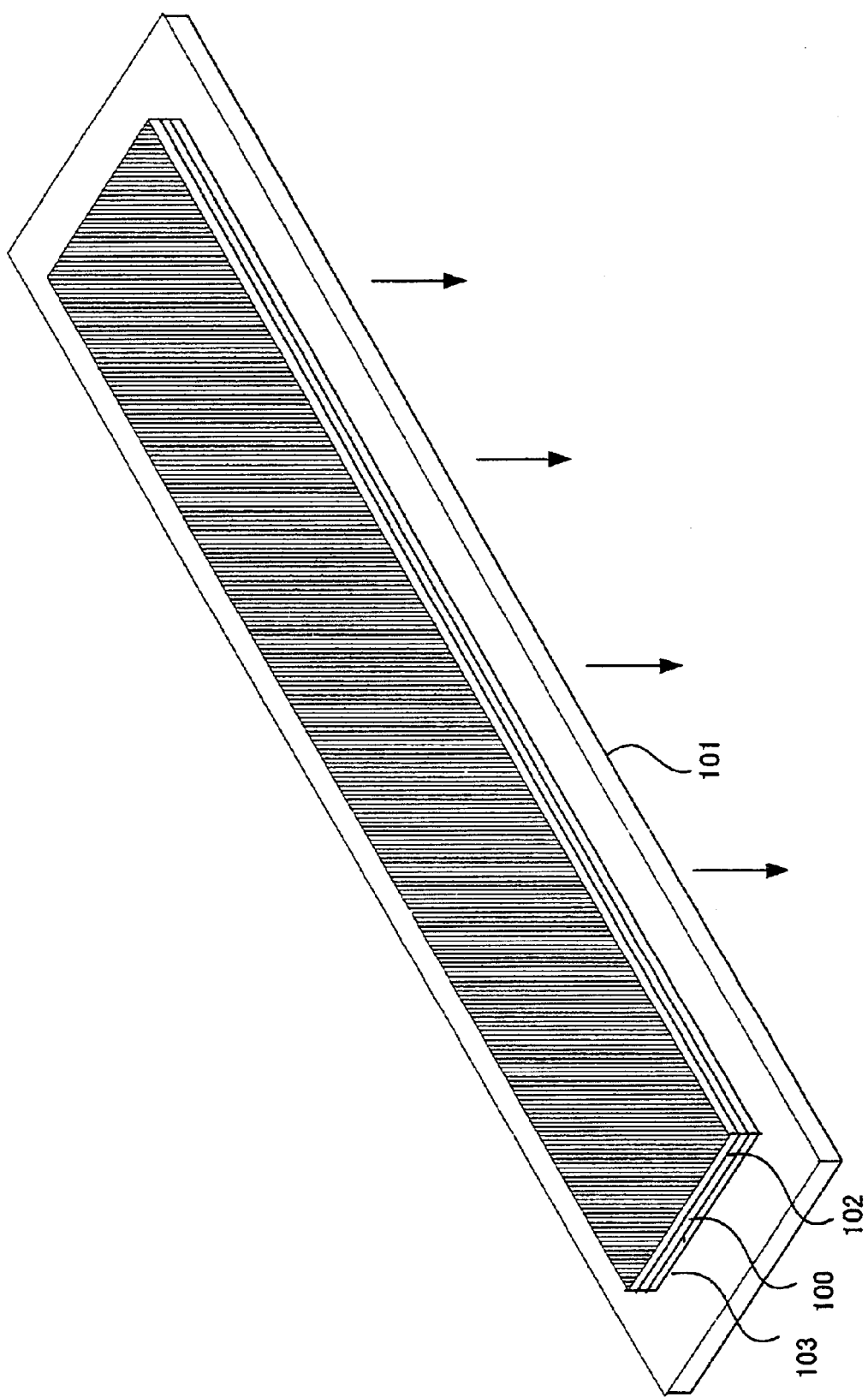
FIG. 2 is a perspective view of a monochromatic surface light emitter using an electroluminescence film.

That is, a transparent electrode film 103 is formed on a transparent substrate 101 of glass, transparent resin or the like which is long in the scanning direction as shown in FIG. 2. And electroluminescence film 100 as light medium is formed on that. Then, metallic electrode 102 is laminated on that.

Figure 3A:
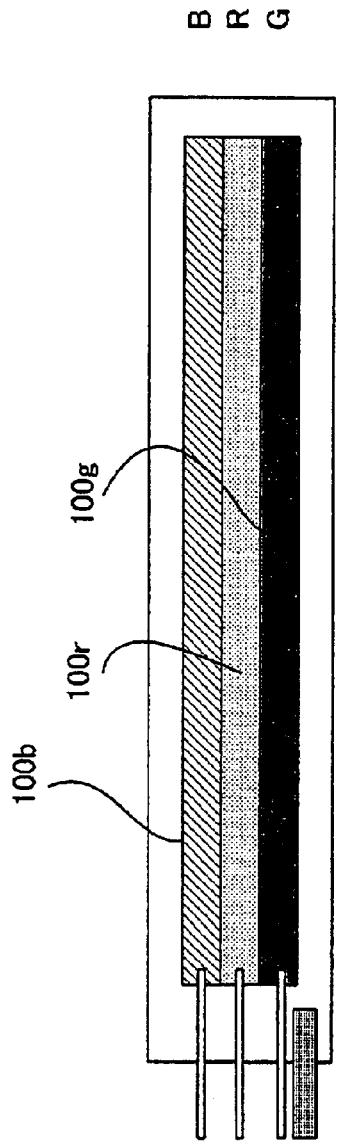
FIGS. 3A and 3B are an explanatory view of a color surface light emitter in which electroluminescence films are used.
Figure 3B:
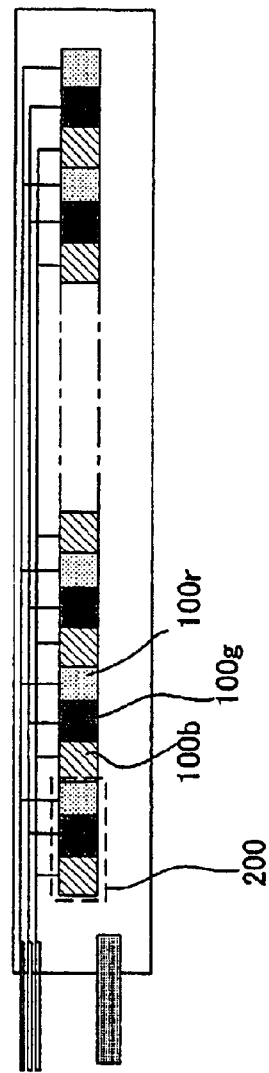

To make such a surface light emitter in color, electroluminescence films 100r, 100g, 100b for R (red), G (green), B (blue), all equal in width, are formed side by side in the lateral direction as shown in FIG. 3A. In another arrangement, light source sets 200 are formed side by side in the longitudinal direction alternately as shown in FIG. 3B, and the color surface light emitter having the same function can be made. The light source set 200 is formed by disposing electroluminescence films 100r, 100g, 100b for the respective colors R, G, B, all equal in width, side by side in the longitudinal direction.

With such surface light emitters, even if light sources 5a, 5b approach reading position Pa, the illuminating intensity will be uniform at this reading position Pa and that permits reduction of the size of the apparatus.

However, in case surface light emitters 5a, 5b are placed near document surface 9, it is necessary to find in advance how the surface light emitters 5a, 5b should be placed to illuminate the document with efficiency and to read the document with high image quality.

As will be described hereunder, therefore, the document surface illuminance and MTF (modulation transfer function) value were measured by varying the position and angle of surface light emitters 5a, 5b, and the measurement results were evaluated. The term MTF as used herein means the resolving power of the sensor.

Figure 8:
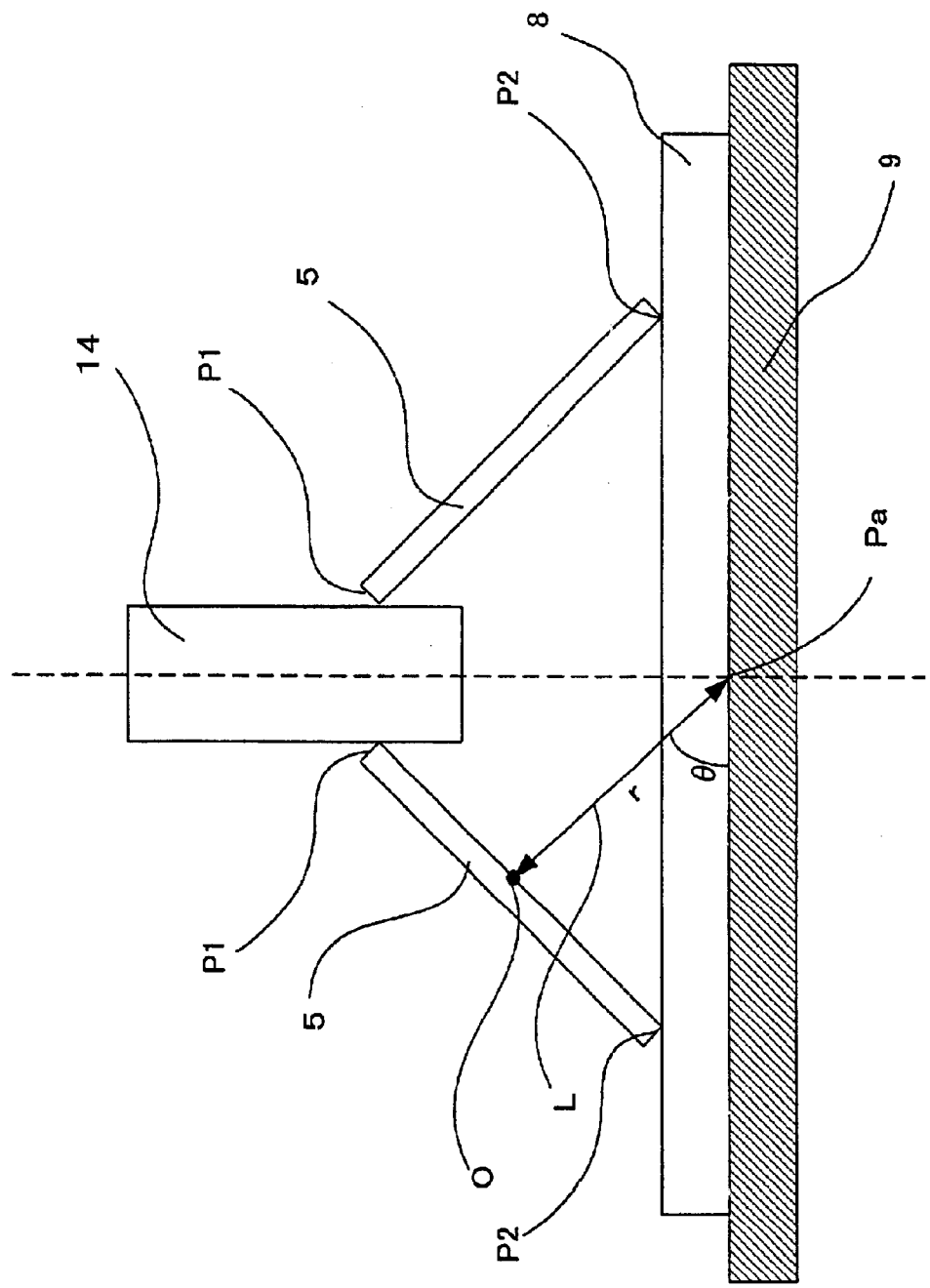
FIG. 8 is an explanatory view of the arrangement of the surface light emitter.

First, two surface light emitters, each 160 mm in length and 4 mm in width, (see FIG. 2) were jointed in the longitudinal direction to obtain ISO paper size A3, and two "A3 size" surface light emitters 5 were mounted on the two sides of fiber lens 14 as shown in FIG. 8. And with length r of segment L between center O of surface light emitter 5 and reading position Pa set at 5 mm, the illuminance on the document surface and MFT value were measured while angle θ was changed from 20° to 70°.

Figure 9A:
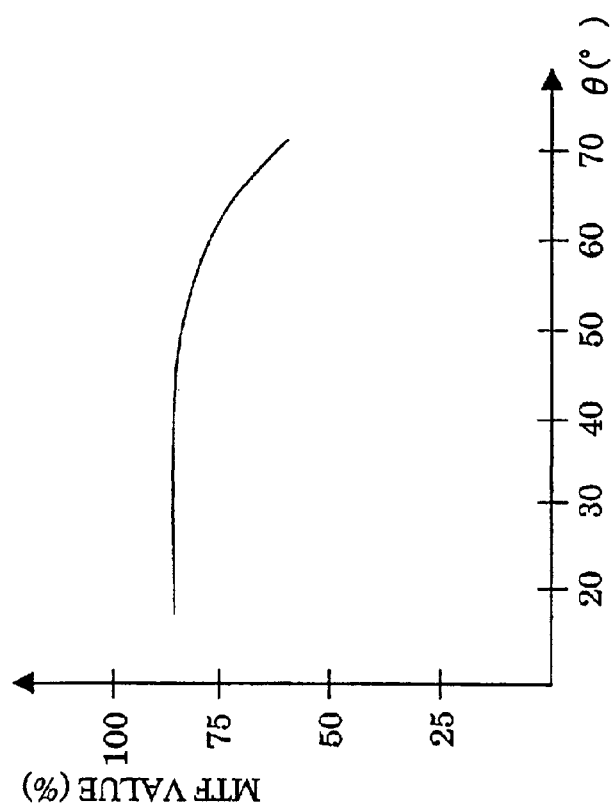
FIGS. 9A and 9B are graphs showing measurement results of the illuminance on the document surface and MTF value.
Figure 9B:
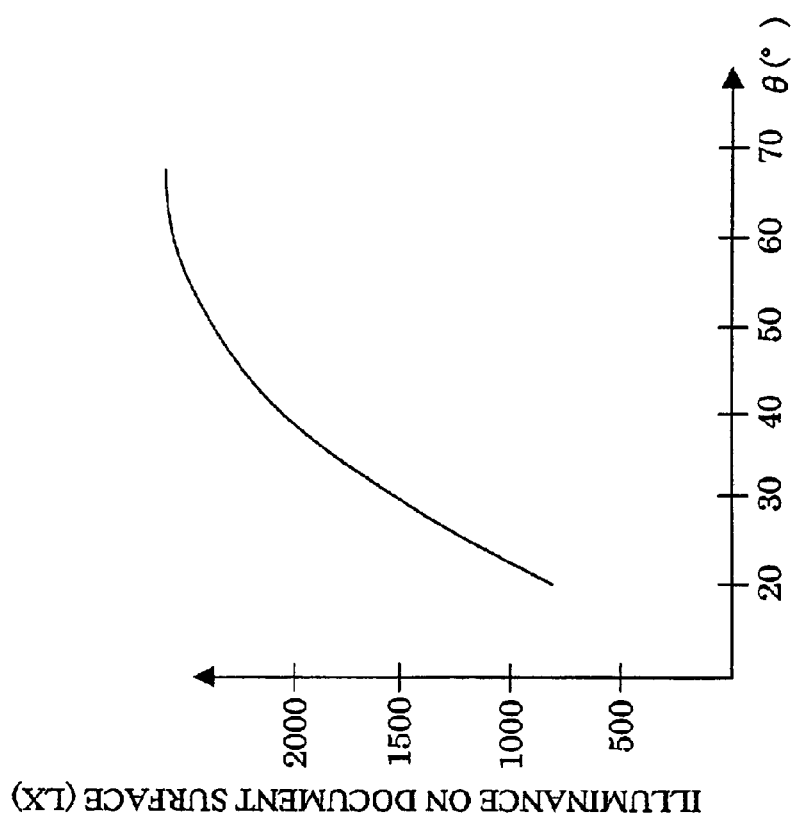

The results showed that the angle θ at which a document surface illuminance of not lower than 1,600 lx could be obtained was not smaller than 30° as shown in FIG. 9A, while the angle θ at which an MTF value of not lower than 75% could be obtained was not larger than 60° as shown in FIG. 9B. That is, it is desirable that the angle θ is between 30° and 60°.

It was also found that the angle θ at which a document surface illuminance of not lower than 2,000 lx could be obtained was not smaller than 40° as shown in FIG. 9A, while the angle θ at which an MTF value of not lower than 80% could be obtained was not larger than 55° as shown in FIG. 9B. That is, it is especially preferable that angle θ is between 40° and 55°.

As shown, according to the present invention, the range of angle θ that can be set is wide—between 30° and 60° and length r of segment L that can be set is short—down to 5 mm, and those offer advantages in reducing the size of the apparatus. While the examples in which the monochromatic light source (FIG. 2) were shown, the same results were obtained when the color light source (FIGS. 3A and 3B) was used.

Hitherto, it has been usual that angle θ is set between 45° and 50°. According to the present invention, the range of angle θ that can be set is wide—between 30° and 60°. That is because the surface light emitter is used in place of the LED array. That is, when the LED array is used, a specific point light source only illuminates reading position Pa, while in case a surface light emitter is used, light illuminates reading position Pa from various angles.

Also, the reason why length r of segment L that can be set down to 5 mm is that a surface light emitter is used. When the LED array is used as in the prior art apparatus, length r of segment L that can be set is not that short, because no uniform illuminating intensity could be obtained. In a typical prior art image reading apparatus, it has been usual that length r of segment L is set at about 9 mm.

The reason why length r of segment L is shortened to 5 mm is not only to reduce the size of the apparatus but also to position the ends of surface light emitter 5 near fiber lens 14 and document table 8 as far as possible. In other words, as shown in FIG. 8, if the upper end P1 of surface light emitter 5 is positioned near fiber lens 14 as far as possible and the lower end P2 of surface light emitter 5 is positioned near document table 8 as far as possible, the diffusion of light can be prevented. And the transmission efficiency of light will improve and the document surface illuminance can be raised.

To raise the document surface illuminance like that, it is desirable that the ends of surface light emitter 5 are positioned within 1 mm from fiber lens 14 and document table 8. That is, when the ends of surface light emitter 5 were positioned within 1 mm from fiber lens 14 and document table 8, a positive result was obtained, that is, the document surface illuminance went up.

Hereinafter, to position the ends of surface light emitter 5 within 1 mm from fiber lens 14 and document table 8 will be expressed in the following way: to secure a state of the ends of surface light emitter 5 coming in contact with or coming close to fiber lens 14 and document table 8.

But it can happen depending on angle θ that it is impossible to secure a state of the ends of surface light emitter 5 coming in contact with or coming close to fiber lens 14 and document table 8. In that case, one end is made to come in contact with or come close to either fiber lens 14 or document table 8.

That is, when it is impossible to secure a state of the ends of surface light emitter 5 coming in contact with or coming close to both fiber lens 14 and document table 8 because angle θ is too large, surface light emitter 5 is so positioned that one end of surface light emitter 5 comes in contact or comes close to fiber lens 14 only. On the other hand, when it is impossible to secure a state of the ends of surface light emitter 5 coming in contact with or coming close to both fiber lens 14 and document table 8 because angle θ is too small, surface light emitter 5 is so positioned that one end of surface light emitter 5 comes in contact or comes close to document table 8 only. Even if surface light emitter 5 is in such a state that one end comes in contact with or comes close to either fiber lens 14 or document table 8, the document surface illuminance rises when compared with the state of coming in contact with or coming close to neither fiber lens 14 nor document table 8.

Though no reference was made in particular in the above description, as shown in FIG. 1, part of the housing H of the apparatus may be present between the ends of surface light emitter 5 and fiber lens 14 or document table 8. In this case, to get an effect, that is, to raise the document surface illuminance, it is desirable the part of the housing H coming in contact with the ends of surface light emitter 5 should be within 1 mm in thickness.

In the above description, a surface light emitter 4 mm in width is used with length r of segment L set to 5 mm, but the present invention is not limited to that. That is, when the document surface illuminance and MTF value were measured using a 2-mm-wide surface light emitter with length r of segment L set at 3 mm and a 1-mm-wide surface light emitter with length r of segment L set at 1 mm, it was also found that angle θ was preferably between 30° to 60°, especially preferably between 40° and 55°.

In the above description, furthermore, examples in which two surface light emitters were used were shown. The present invention is not limited to that. An arrangement in which one surface light emitter is used is also within the scope of the present invention.

Embodiment 2

In Embodiment 1, the fiber lens is used. If a micro lens made in the following procedure is used instead of the fiber lens, the size of the apparatus can be further reduced.

First, sensitive glass 13 that will be used as a substrate for forming a micro lens array is prepared by adding sensitive metals (Au, Ag, Cu) and a sensitizer (CeO2) to SiO2-Li2O-Al2O3 type glass. This sensitive glass 13 is 320 mm in length, 1–2 mm in width and 1 mm in thickness.

Figure 11A:
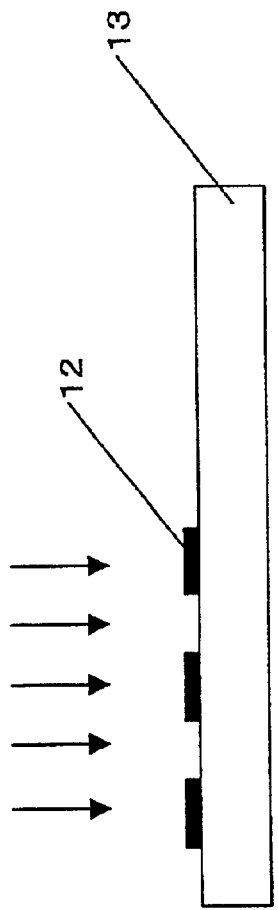
FIGS. 11A and 11B are explanatory illustration of a micro lens array made by photo lithography.

As shown in FIG. 11A, photo mask 12 made of chromium etc. is formed on sensitive glass 13 thus prepared. In the photo mask 12, the shape of the light-shielding part may be circular, elliptic or polygonal as long as the required converging characteristics are obtained, but the shape is preferably circular.

In case the light-shielding part is circular, it is desirable that the light-shielding part is about 35 μm in diameter and the interval between the light-shielding parts is about 42.3 μm. But it is noted that these values are set on assumption that the resolving power of the sensor is 600 dpi.

Figure 11B:
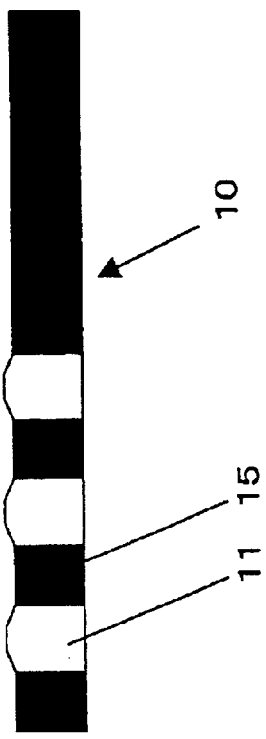

Then, sensitive glass 13 with photo mask 12 formed thereon is irradiated with 7,500 to 10,000 μJ/cm$^2$ of ultraviolet rays with 200 nm to 400 nm in wave length and then heat-treated at 500° C. Then, as shown in FIG. 11B, the unmasked parts of sensitive glass 13 shrink and change in color. And the unmasked parts form light-shielding film 15 while the masked parts of sensitive glass 13 become micro lens 11.

Figure 12:
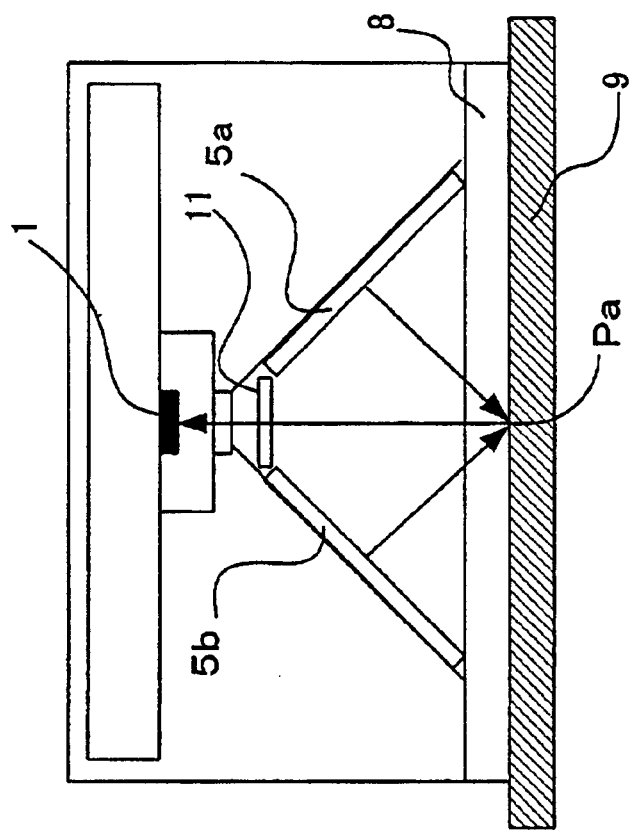
FIG. 12 is a constitutional view of an image reading apparatus in Embodiment 2.

The lens of the micro lens array made in the above procedure is some 1 mm—much smaller than the lens of fiber lens 14. If such a micro lens 11 is used, the distance (conjugate length) from sensor 1 to document surface 9 can be shortened—down to about 2 mm, as shown in FIG. 12. Needless to say, that can reduce the size of the apparatus as compared with that in Embodiment 1.

The method of making micro lens array 10 is not limited to the above procedure. Micro lens array 10 can be made by injection molding, too, for example. The suitable materials include heat-resistant acrylic resin and non-crystalline polyolefin. It is desirable to select a material resistant to high temperature, high humidity, thermal shock etc. and high in light transmittance.

In case a micro lens array is made by injection molding, light-shielding film 15 may be provided on the incident side of the lens as shown in FIG. 10A, on the outgoing side of the lens as shown in FIG. 10B or on both sides, that is, on the incident side and on the outgoing side as shown in FIG. 10C. In case light-shielding film 15 is provided on the outgoing side of the lens, the space 16 between the lens and light-shielding film 15 may be vacuum or merely void.

Embodiment 3

Meanwhile, to control the delivery of goods, the forwarding agent directs deliverymen to inform the host computer that goods are on the way or have been delivered. And when goods are loaded on the forwarding truck or after goods are delivered to the destination, the deliveryman reads the delivery slip as image data with a portable scanner and sends the reading results to the host computer.

However, characters and drawings (for example, line forming a limited space for the slip number, line forming a limit space for the name and address at which goods are to be delivered) that are not necessary for the host computer to control deliveries are also printed on the delivery slip. Therefore, the image data read by the deliveryman with the portable scanner contain characters and designs not needed for the host computer to control deliveries.

To eliminate them, in the past, the delivery slip is read with a portable scanner mounted with software provided with a function to edit image data (hereinafter "image editing soft"). That is, by use of editing function of image editing software, the line forming a limited space for the slip number can be eliminated from the image data read with the portable scanner. And only the image data of characters and drawings (for example, image data of slip number) required by the host computer for control of deliveries can be extracted.

However, the problem is that when a large number of delivery slips are handled in such a technique, it takes much time and labor to edit the image date read by the portable scanner.

Figure 13:
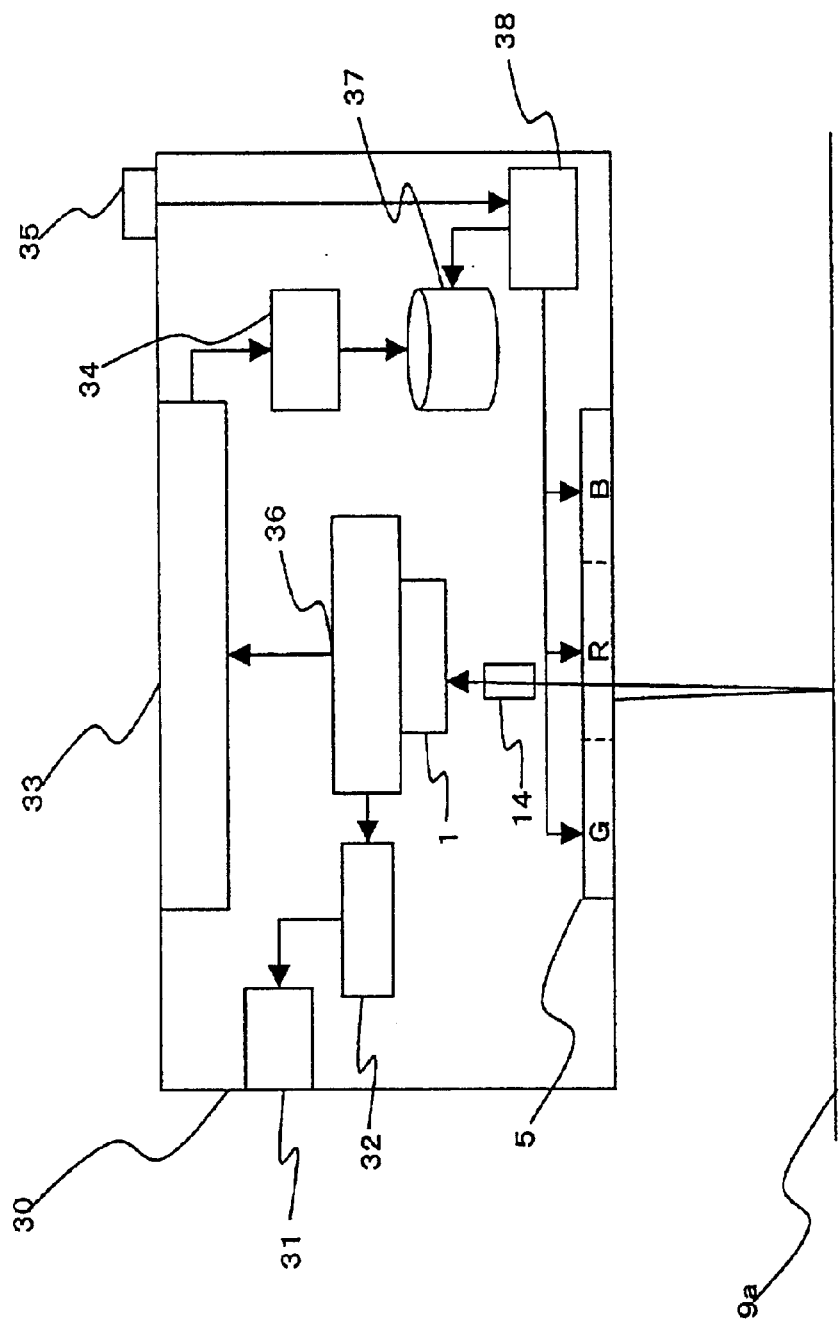
FIG. 13 is an explanatory view of a scanner in Embodiment 3.

Now there will be explained the makeup and operation of scanner 30 adopted in this embodiment with reference to FIG. 13. The arrangement of surface light emitter 5, fiber lens 14, and sensor 18 shown in FIG. 13 are the same as that in Embodiment 1 or 2 and will not be explained.

First, the forwarding agent separates into R, G, B etc. the color of characters and drawings not required for the host computer to control deliveries (color of the line forming a limited space printed on delivery slip 9*a*).

Figure 14:
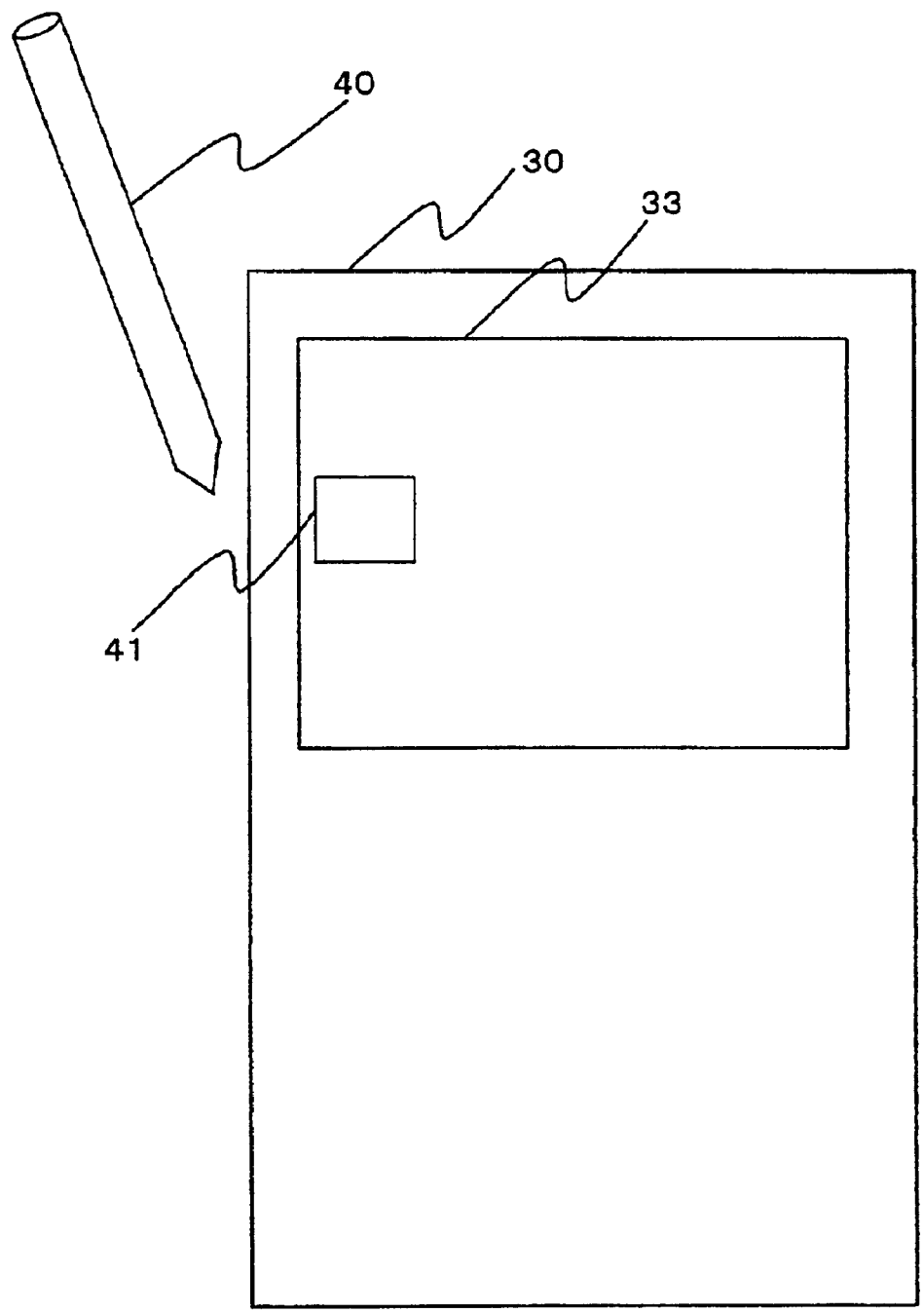
FIG. 14 is an explanatory view showing that a light source is made to emit light in color in the initial stage.

That is, with the reading surface of scanner 30 directed to delivery slip 9*a*, color memory button 41 displayed on display screen 33 as shown in FIG. 14 is pressed with an pointer 40 such as the finger, electronic pen or the like. Then, light emitting control means 38 controls surface light emitter 5 so as to emit each of the colors, R, G, B separately, and light receiving means 36 receives reflected light of each of colors, R, G, B from delivery slip 9*a* through fiber lens 14 and sensor 1.

Figure 15:
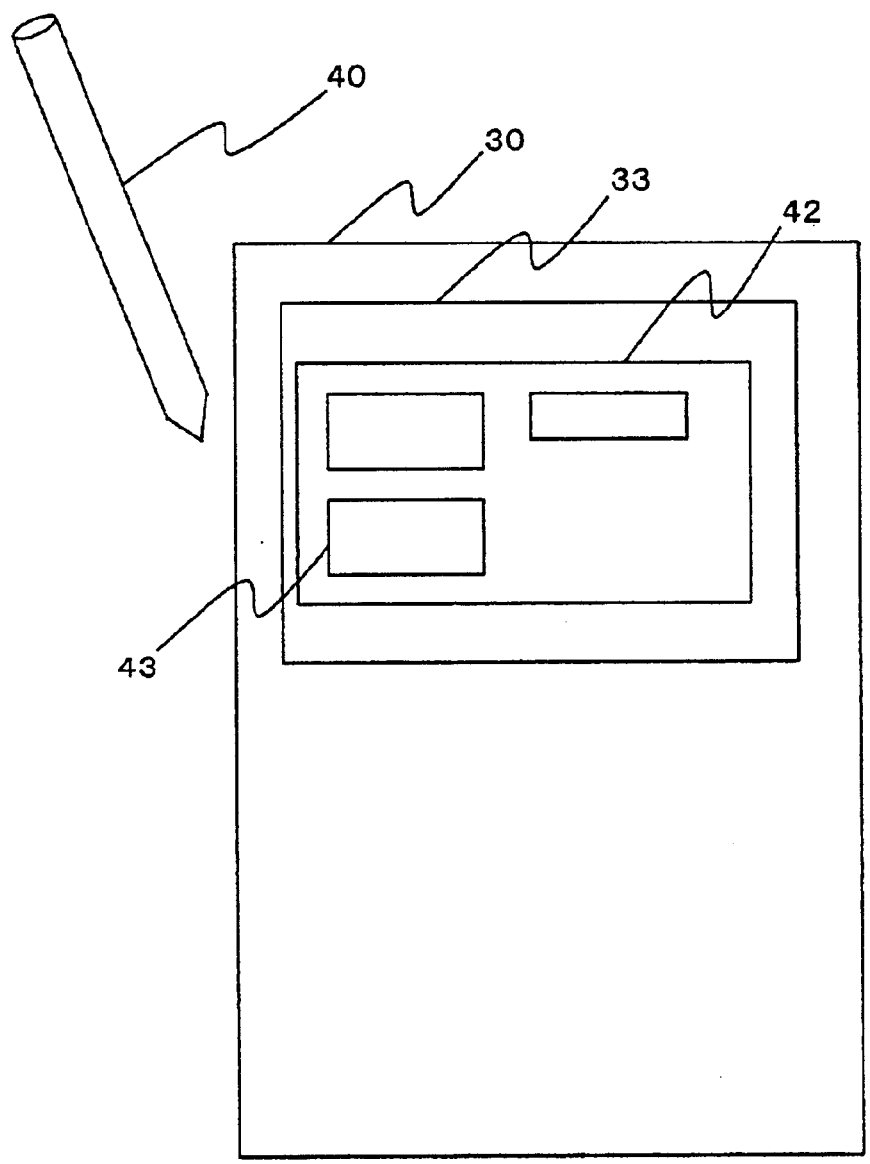
FIG. 15 is an explanatory view showing that a line forming a limited space is specified.

Here, light receiving means 36 generates three image data on the basis of the reflected light of each of the colors R, G, B of the received light. Color image data of the delivery slip is obtained by synthesizing the three image data thus generated, and as shown in FIG. 15, image data 42 of this delivery slip is displayed on display screen 33.

When image data 42 of the delivery slip is displayed on display screen 33 that way, the operator of scanner 30 specifies with pointer 40 the position where the characters and drawings (line 43 forming a limited space, for example) not required for the host computer to control deliveries. Thereby, color separation means 34 obtains density data of each of the RGB colors by separating the color of an image at the position specified with pointer 40, and stores these density data in storing means 37.

As a result, the density data of the color of the line forming a limited space is stored in storing means 37. Scanner 30 with density data thus stored is handed over from the forwarding agent to the deliveryman.

The above method of separating color is not the only way. There are various methods of separating color depending on the arrangement of surface light emitter 5. In the above description, furthermore, color image data is obtained by separately illuminating the light of each of the RGB colors from surface light emitter 5. The same color image data can be obtained by illuminating the light of daylight color from surface light emitter 5.

Meanwhile, the deliveryman has the duty to inform the host computer of the delivery conditions of goods and when goods are delivered to the destination, the deliveryman presses reading switch 3 of scanner 30. If reading switch 3 is pressed like that, light emitting control means 38 controls the light emitting of surface light emitter 5 on the basis of density data stored in storing means 37. Needless to say, since density data of the color of the line forming a limited space printed on delivery slip 9*a* is stored in storing means 37, the light of the same color as that of the line forming a limited space is illuminated on delivery slip 9*a*.

Light receiving means 36 that receives reflected light from delivery slip 9*a* like that can not recognize the line forming a limited space. That is, light receiving means 36 recognizes characters and drawings—except for the line forming a limited space—such as the delivery number, address and name of the delivery destination, kind of goods etc.

Then, image data of delivery slip 9*a* without the line forming a limited space is generated by light receiving means 36, and the image data thus generated is referred to character recognition means 32 such as optical character reader (OCR). Character recognition means 32 recognizes the slip number etc. from the image data received from light receiving means 36, and refers information such as the slip number etc. thus recognized to sending means 31. Sending means 31 sends to the host computer information such as the slip number etc. received from character recognition means 32.

Needless to say, information such as the slip number etc. recognized by character recognition means 32 may be displayed on display screen 33 before being referred to sending means 31. Hereby, the deliveryman can check if character recognition means 32 recognizes the slip number etc. correctly.

If it is confirmed that character recognition means 32 recognizes the slip number etc. correctly, the sending button etc. displayed on display screen 33 is pressed with pointer 40. If the sending button is pressed, then information such as the slip number etc. is referred to sending means 31 from character recognition means 32. On the other hand, if it is found that character recognition means 32 recognizes a wrong slip number etc., the deliveryman reads delivery slip 9*a* again in the same procedure as described above.

As set forth above, scanner 30 in the present embodiment illuminates delivery slip 9*a* with light of the same color as that of the line forming a limited space, and the line forming a limited space can not be read. Therefore, the process of extracting information such as the slip number etc. from the image data read by scanner 30 can be omitted. Needless to say, it is not necessary to install image editing soft in the scanner as in the past.

Figure 16:
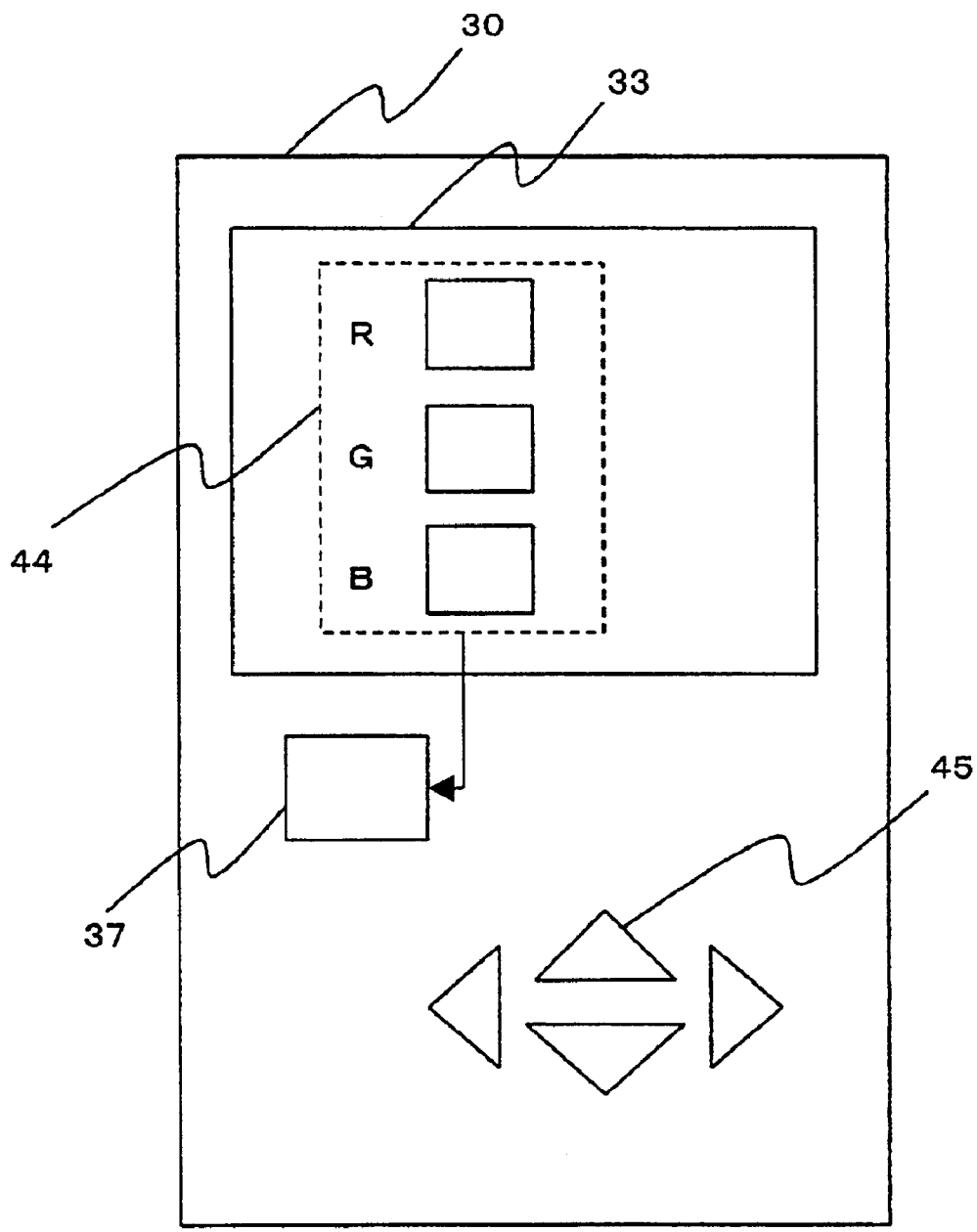
FIG. 16 is an explanatory view showing that density data is inputted.
Figure 17:
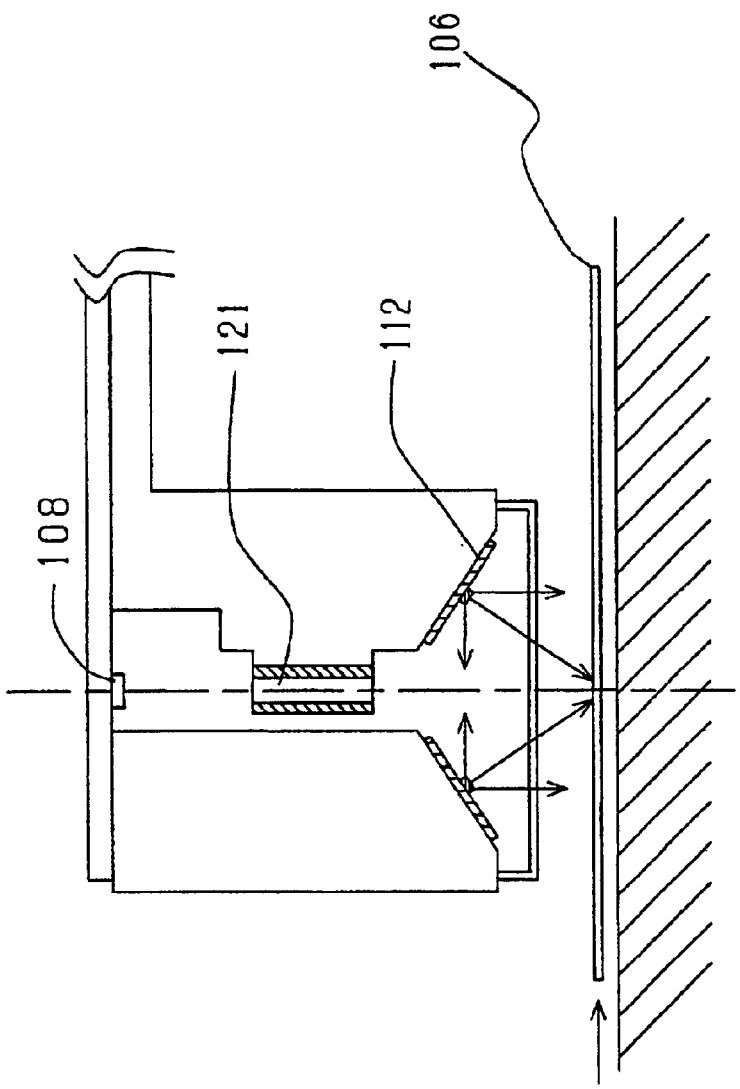
FIG. 17 is a constitutional view of a prior art image reading apparatus.
Figure 18:
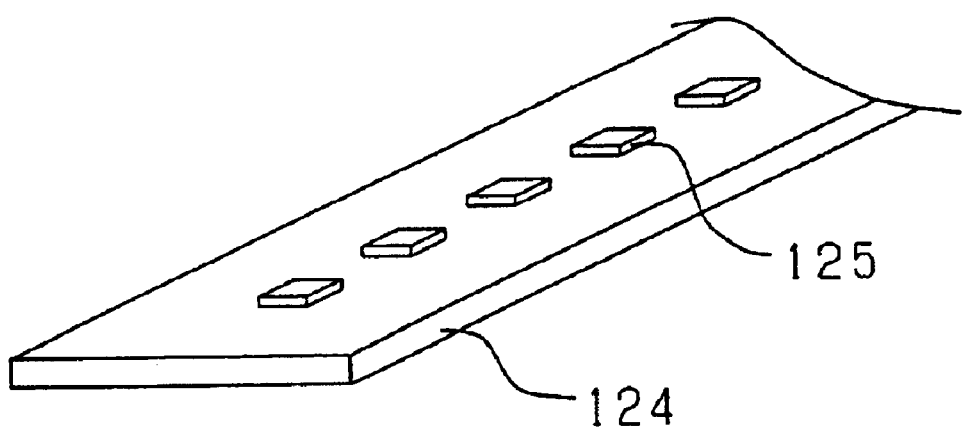
FIG. 18 is a perspective view mounted in the prior art image reading apparatus.

The technique of storing density data in storing means 37 is not limited to the method described above. For example, an arrangement may be so made that if the switch of scanner 30 is turned on, menu (density specifying means) 44 to specify the density of a desired color as shown in FIG. 16 will be displayed on display screen 33. If such a menu is provided, it will be possible to specify the density of each of the colors RGB in value using cursor key 45 etc. Needless to say, the density specified here is stored in storing means 37 as density data.

It was mentioned that the arrangement of surface light emitter 5 and fiber lens 14 shown in FIG. 13 is the same as that in Embodiment 1 or 2, but the present invention is not limited to that. That is, it is assumed here that scanner 30 is a portable scanner, and in order to reduce the size, a surface light emitter is adopted for surface light emitter 5 shown in FIG. 13. Furthermore, as lens 14 shown in FIG. 13, a fiber lens or micro lens is adopted. But in case there is no need to reduce the size of scanner 30, the arrangement of surface light emitter 5 and fiber lens 14 shown in FIG. 13 is not limited in particular.

A procedure for eliminating a monochromatic line forming a limited space is exemplified and explained above. But in case the lines forming limited spaces printed on delivery slip 9a are different in color depending on the degree of importance of entries, there may be a need to eliminate lines forming limited spaces in a plurality of colors.

In such a case, image data 42 of the delivery slip is displayed on display screen 33 in the above procedure, and then a plurality of lines forming limited spaces displayed in different colors are specified with pointer 40 one after another. In this way, density data of a plurality of colors are stored in storing means 37, and light emitting control means 38 will so control the surface light emitter 5 as to emit light of a plurality of colors one after another. And light receiving means 36 generates a plurality of image data on the basis of the reflected light from delivery slip 9a, and image data contained in all a plurality of image data thus generated are extracted.

For example, in case of red, blue green lines forming limited spaces printed on delivery slip 9a, the red and blue lines need to be eliminated with the green line forming a limited space alone left intact, light receiving means 36 generates image data on the basis of the red reflected light and also image data on the basis of the blue reflected light. Needless to say, image data generated on the basis of the red reflected light has only the blue and green lines forming limited spaces, while image data generated on the basis of the blue reflected light has only the red and green lines. If, therefore, image data contained in all the two image data thus generated is extracted, the red and blue lines forming limited spaces are eliminated with only the green line left.

In another example, in case density data of a plurality of colors are stored in storing means 37, an arrangement may be so made that if reading button 35 is pressed, the plurality of colors will be displayed on display screen 33. This way, from a plurality of colors displayed on display screen 33, a color that needs to be eliminated or left intact can be selected with pointer 40 or the like.

Finally, controlling delivery of goods by the forwarding agent is exemplified and explained above, but it goes without saying that the example where scanner 30 the present invention is applied to is not limited to such a case.

What is claimed is:

1. An image reading apparatus for optically reading an image drawn on a document surface, said apparatus comprising:
    two surface light emitters mounted at a specific angle over the document surface in a bilaterally symmetrical state and kept apart a certain gap away from each other, said surface light emitters made by forming a light emitting layer on a transparent substrate and
    a fiber lens mounted in the gap between said two surface light emitters, said fiber lens made by bundling a plurality of optical fibers.

2. An image reading apparatus for optically reading an image drawn on a document surface, said apparatus comprising:
    one surface light emitter mounted over the document surface at a specific angle, said surface light emitter made by forming a light emitting layer on a transparent substrate, and
    a fiber lens mounted near the upper end of said one surface light emitter, said fiber lens made by bundling a plurality of optical fibers.

3. The image reading apparatus of claim 1 or 2 wherein the distance between the center of said surface light emitter and the reading position is not smaller than 1 mm and not larger than 5 mm.

4. The image reading apparatus of claim 1 or 2 wherein a conjugate length of said fiber lens is not smaller than 3.2 mm and not larger than 8.0 mm.

5. The image reading apparatus of claim 1 or 2 wherein said surface light emitter is so mounted that at least one of the two ends of said surface light emitter comes in contact with or comes close to at least either the fiber lens or the document table.

6. The image reading apparatus of claim 5 wherein said surface light emitter is so mounted that with the angle formed by the segment between the center of said surface light emitter and the reading position with the document surface as θ, when this θ is an angle within a specific range, the ends of said surface light emitter come in contact with or come close to both fiber lens and document table.

7. The image reading apparatus of claim 5 wherein said surface light emitter is so mounted that with the angle formed by the segment between the center of said surface light emitter and the reading position with the document surface as θ, when this θ is an angle larger than a specific range, one end of said surface light emitter comes in contact with or comes close to the fiber lens only.

8. The image reading apparatus of claim 5 wherein said surface light emitter is so mounted that with the angle formed by the segment between the center of said surface light emitter and the reading position with the document surface as θ, when this θ is an angle smaller than a specific range, one end of said surface light emitter comes in contact with or comes close to the document table only.

9. The image reading apparatus of claim 1 or 2 wherein a plurality of optical fibers are bundled with a light absorbing layer formed therearound.

10. The image reading apparatus of claim 1 or 2 wherein a light absorbing layer is formed around each of said optical fibers.

11. The image reading apparatus of claim 1 or 2 wherein a micro lens is adopted in place of said fiber lens.

12. An image reading apparatus for optically reading an image drawn on a surface of a document, said apparatus comprising:
    a light source for illuminating the document surface;
    a light-emitting control means for controlling said light source to emit light in a specific color which is contained in the document; and
    color separation means for separating a specific color contained in a document,
    wherein said light-emitting control means controls the light emitting of said light source on the basis of the separation results of the color separation means.

13. An image reading apparatus for optically reading an image drawn on a surface of a document, said apparatus comprising:

a light source for illuminating the document surface;

a light-emitting control means for controlling said light source to emit light in a specific color which is contained in the document; and density specifying means for specifying the color density, wherein said light-emitting control means controls the light emitting of said light source on the basis of the density specified by said density specifying means.

14. The image reading apparatus of claim 12 or 13 which further comprises storing means for storing density data from said color separation means or said density specifying means and wherein said light emitting control means controls the light emitting of said light source.

15. The image reading apparatus of claim 12 which further comprises light receiving means for generating a plurality of image data on the basis of reflected light from the document and extracting image data contained in all the plurality of image data thus generated.

16. The image reading apparatus of claim 15 wherein said light source emits red light, green light, and blue light.

* * * * *